Figures 2, 3:
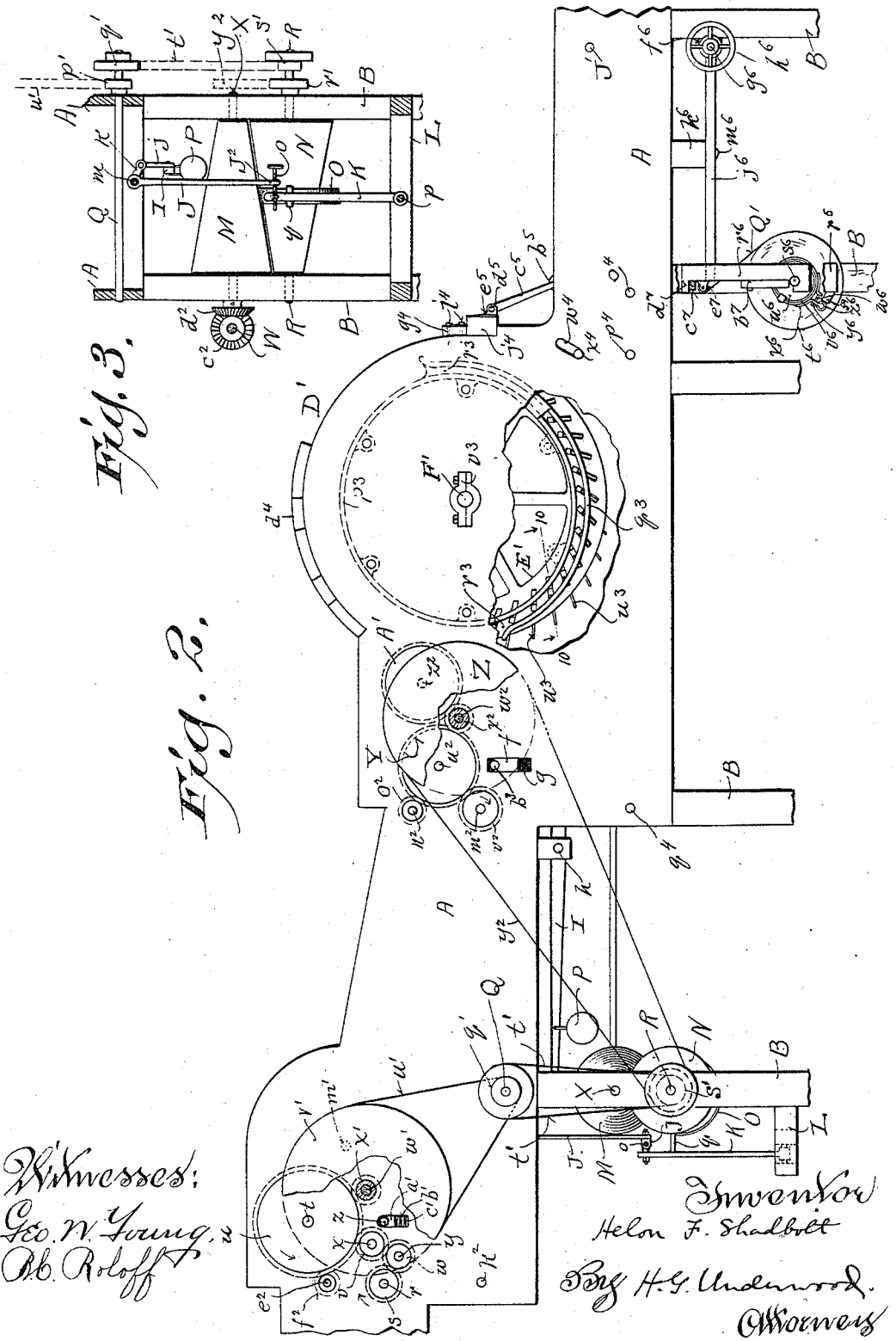

(No Model.) 5 Sheets—Sheet 1.
H. F. SHADBOLT.
MACHINE FOR MANUFACTURING EXCELSIOR WRAPPERS OR PADS.
No. 570,236. Patented Oct. 27, 1896.
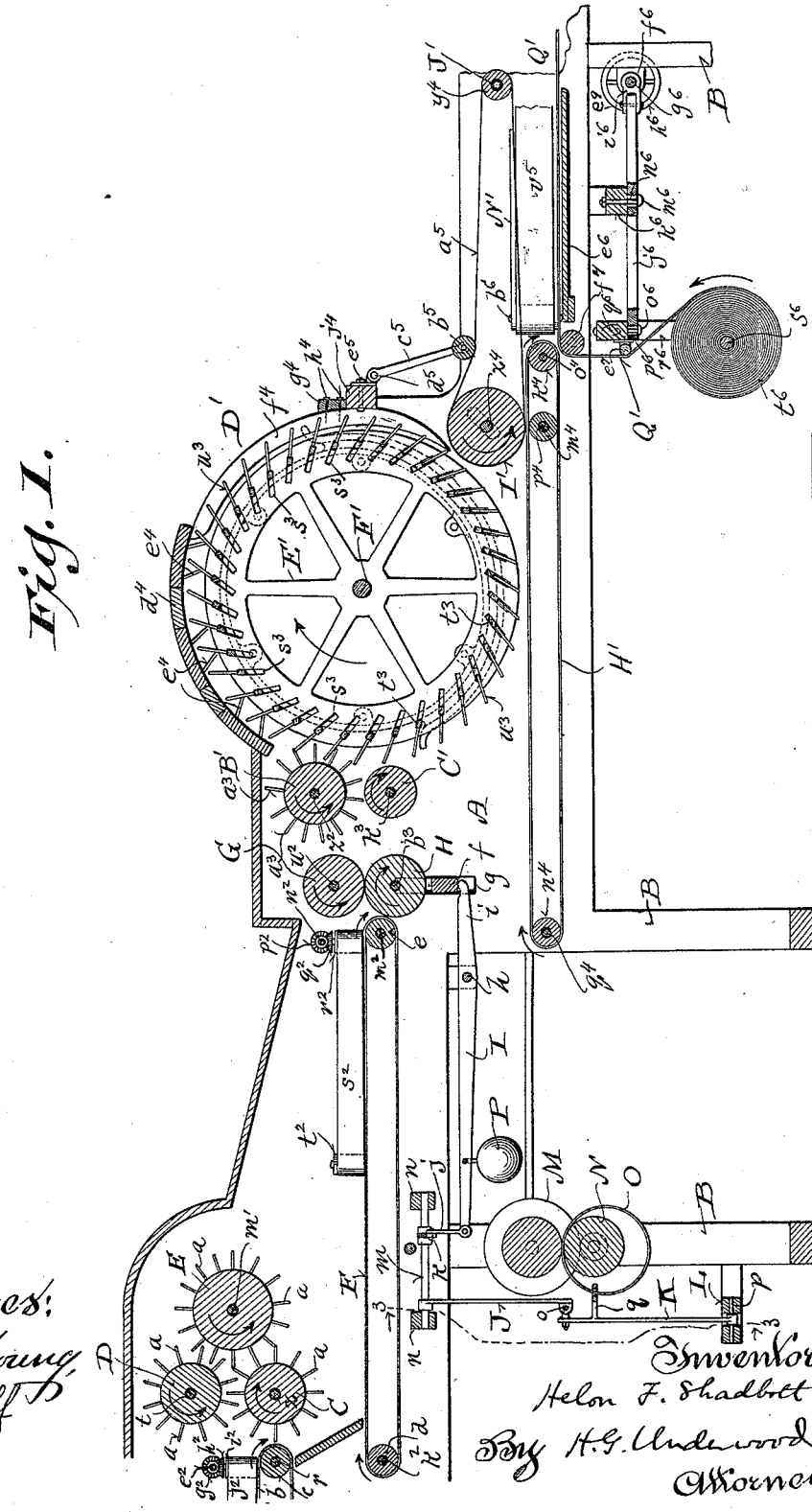

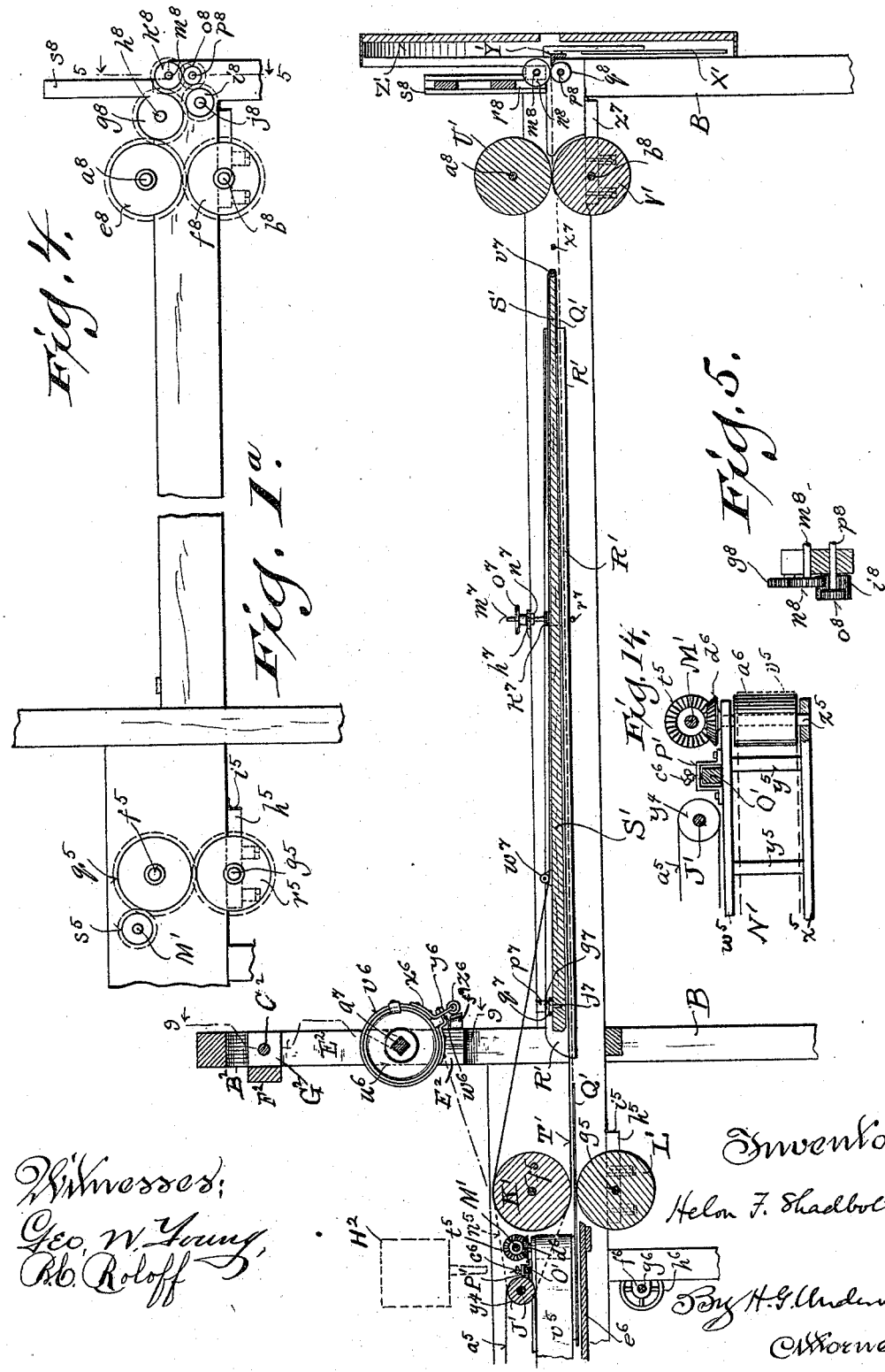

(No Model.) 5 Sheets—Sheet 3.

H. F. SHADBOLT.
MACHINE FOR MANUFACTURING EXCELSIOR WRAPPERS OR PADS.

No. 570,236. Patented Oct. 27, 1896.

Witnesses:
Geo. W. Young
B. E. Roloff

Inventor
Helon F. Shadbolt
By H. G. Underwood
Attorneys (No Model.) 5 Sheets—Sheet 4.
H. F. SHADBOLT.
MACHINE FOR MANUFACTURING EXCELSIOR WRAPPERS OR PADS.
No. 570,236. Patented Oct. 27, 1896.
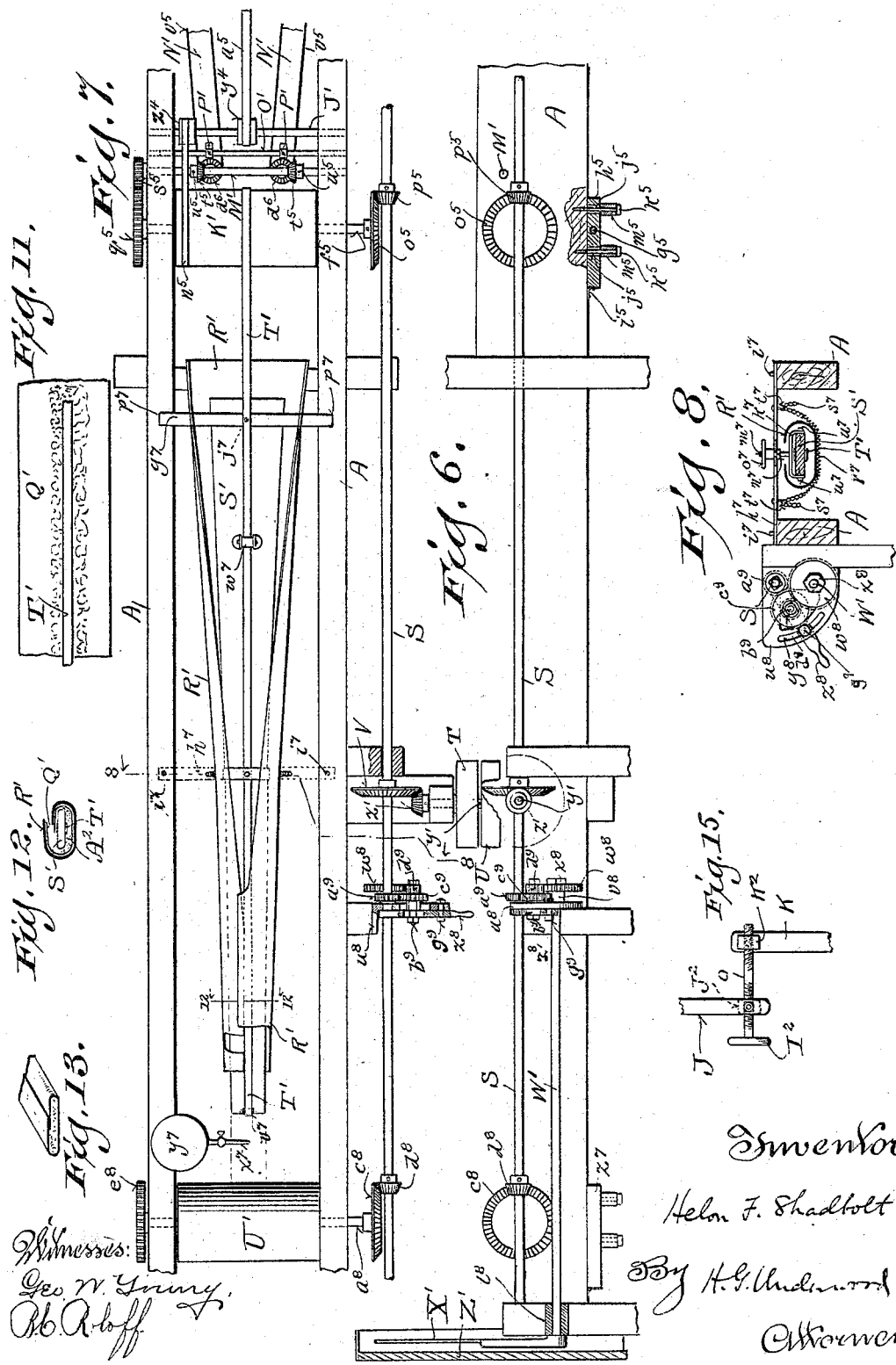

(No Model.) 5 Sheets—Sheet 5.
H. F. SHADBOLT.
MACHINE FOR MANUFACTURING EXCELSIOR WRAPPERS OR PADS.
No. 570,236. Patented Oct. 27, 1896.
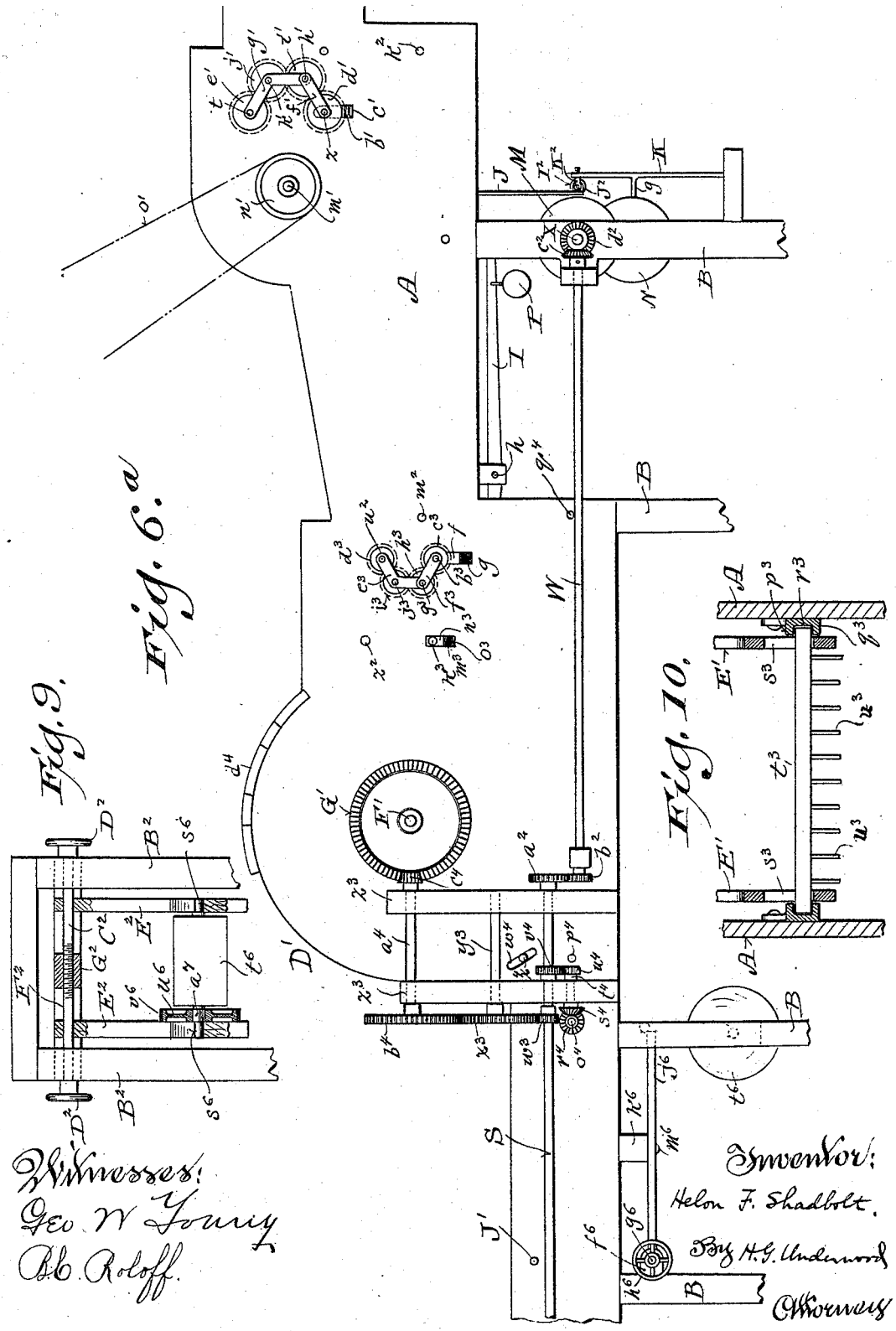
Witnesses:
Geo. W. Young
B. C. Roloff
Inventor:
Helon F. Shadbolt.
By H. G. Underwood
Attorneys

UNITED STATES PATENT OFFICE.

HELON F. SHADBOLT, OF SHEBOYGAN, WISCONSIN, ASSIGNOR TO THE EXCELSIOR WRAPPER COMPANY, OF SAME PLACE.

MACHINE FOR MANUFACTURING EXCELSIOR WRAPPERS OR PADS.

SPECIFICATION forming part of Letters Patent No. 570,236, dated October 27, 1896.

Application filed May 1, 1896. Serial No. 589,830. (No model.)

*To all whom it may concern:*

Be it known that I, HELON F. SHADBOLT, a citizen of the United States, and a resident of Sheboygan, in the county of Sheboygan and State of Wisconsin, have invented certain new and useful Improvements in Machines for the Manufacture of Excelsior Wrappers and Pads; and I do hereby declare that the following is a full, clear, and exact description thereof.

My invention relates to the manufacture of excelsior wrappers and pads and the like; and it consists in the peculiarities of construction and combination of parts of certain mechanism for accomplishing this purpose, being in part an improvement on the mechanism set forth in Letters Patent No. 430,325, granted June 17, 1890, to Edgar J. Stewart, all as will be fully set forth hereinafter, and subsequently claimed.

In the drawings, Figures 1 and 1$^a$ represent a central vertical section through the entire machine, partially broken away at one end. Fig. 2 is a side elevation of that portion of the machine shown in Fig. 1, with parts broken away and showing the driving-gear. Fig. 3 is a detail transverse sectional view on line 3 3 of Fig. 1, showing in elevation the automatic speed-regulating device. Fig. 4 is a side elevation showing the driving-gear of the part of the machine shown in Fig. 1$^a$ on the right-hand side of the machine. Fig. 5 is a detail transverse sectional view on the line 5 5 of Fig. 4, showing the gearing of the rolls that feed the completed wrapper to the cutting mechanism. Fig. 6 is a view corresponding to Fig. 4, but showing the other or left-hand side of that part of the machine. Fig. 6$^a$ is a continuation of Fig. 6 and shows the exterior of the parts of the machine shown in Figs. 1 and 2, but on the other or left-hand side of that part of the machine. Fig. 7 is a plan view, partly broken away, of the part of the machine shown in Fig. 6. Fig. 8 is a transverse detail sectional view on the line 8 8 of Fig. 7. Fig. 9 is a transverse detail sectional view on the line 9 9 of Fig. 1$^a$. Fig. 10 is a detail sectional view on the line 10 10 of Fig. 2. Fig. 11 is a detail view showing the paper, excelsior, and holding-tape. Fig. 12 is a transverse detail sectional view on the line 12 12 of Fig. 7. Fig. 13 is a transverse detail sectional view of the completed wrapper. Figs. 14 and 15 are enlarged detail views.

Referring to the drawings, A A represent the side pieces of a frame supported by uprights B B, said side pieces being suitably connected by bottom strips and having bearings for the various rollers of the machine.

C D E are rollers having picker-teeth $a\ a\ a$ to receive the excelsior fed to them over the endless belt $b$, one end only of which belt, with its adjacent roller $c$, being shown in Fig. 1. The rollers C D revolve slowly, and the roller E much faster, the result being that the excelsior passes between the rollers C D and is carried down by the roller E (after being picked to pieces) and dropped on the endless belt F, (whose rollers $d\ e$ are journaled in the side pieces A,) and thence carried along to and between the rollers G H, the roller G always revolving on the same plane, while the journal of the roller H has a yielding bearing on a yoke $f$, moving in slots $g$ in the side pieces A A of the machine.

I is a lever suspended, as shown at $h$, from a hanger beneath this end of the machine, and the free end $i$ of this lever I bears up under the center of the yoke $f$, so as to normally keep the rollers G H in contact. The other end of the lever I is connected by a link $j$ to a crank-arm $k$, rigidly secured to a rod $m$, journaled in boxes $n\ n$ on the inner side of one of the side pieces A.

J is a lever also rigidly secured to this rod $m$, a shackle-lug J$^2$ on the other end of this lever J being united by a right and left handed screw-bolt $o$ (best shown in Fig. 15) to a shackle-lug K$^2$ on the adjacent end of another lever, K, which latter is pivoted, as shown at $p$, to a frame L, projecting from the end pair of supports B B at this end of the machine. Between these supports are journaled a pair of cone-pulleys M N, placed just far enough apart to avoid contact, this contact being supplied by a leather or other flexible ring O, surrounding the pulley N and supported by an arm $q$, projecting from the lever K.

P is a weight suspended from the lever I adjacent to the linked end of said lever. When the excelsior is feeding too fast, it will crowd the roller H down away from the roller G, and this will serve, through yoke $f$ and lever I and connections, to partly revolve rod $m$, thereby moving levers J and K and shifting the position of the ring O between the cone-pulleys N M, thereby regulating the speed of the feeding devices, as hereinafter explained.

The roller $c$, which carries that end of the endless belt $b$ adjacent to the head of the machine, is rigidly secured to its journal $r$, which has bearings in the side pieces A, and near one end this journal $r$ has secured thereto a toothed pinion $s$. (Shown in Fig. 2.) The picker-roller D is rigidly secured to its journal $t$, which, in the arrangement shown, is mounted in bearings in the side pieces A, so as to always revolve in the same plane, and said journal $t$ has secured thereto, near one end, a gear-wheel $u$, and the gear-wheel $u$ and pinion $s$ are connected by toothed pinions $v\ w$, which revolve loosely upon studs $x\ y$, projecting from the exterior surface of one of the side pieces A. The picker-roller C is rigidly secured to its journal $z$, but in the arrangement shown the journal $z$ has yielding bearings on boxes $a'$ vertically movable within slots $b'$ in the side pieces and having springs $c'$ beneath said boxes. If preferred, this arrangement may be reversed, that is, the journal $z$ of the lower roller C may be mounted so as to always revolve in the same plane, and the journal $t$ of the upper roller D may have yielding bearings, as the result will be the same in either case. In order to provide for this yielding and separation of the picker-rollers C D, their shafts $z\ t$ carry on their opposite ends (outside of the adjacent side piece A, in which they have bearing) toothed pinions $d'\ e'$, Fig. 6$^\text{a}$, rigidly secured thereto, and said journals are connected by linked straps $f'\ g'$, the pin $h'$, which forms the pivotal connection of said straps, also carrying a loose toothed pinion $i'$ in mesh with pinion $d'$, and also in mesh with a like toothed pinion $j'$, loosely mounted on a pin or stud $k'$ on the strap $g'$, this latter pinion $j'$ being also in mesh with the pinion $e'$.

The picker-roller E is rigidly secured to its journal $m'$, which journal passes through the side pieces A and finds bearing therein, and on one outer end carries a pulley $n'$, by means of which it is revolved by power-belt $o'$ at a high rate of speed.

Q is a shaft, Figs. 2 and 3, extending across the machine and journaled in the side pieces A A above and in line with the shafts of the cone-pulleys M N, already described. Just outside the adjacent side piece, at one end of the shaft Q, the latter carries a small belt-pulley $p'$, and beyond that a stepped cone-pulley $q'$. (Only two steps being shown, but the number being greater, if desired, in any instance.) R is the shaft of the lower cone-pulley N, and the said shaft carries (on this same side) a large belt-pulley $r'$, (about in line with the smaller pulley $p'$ above,) and beyond this a stepped cone-pulley $s'$, exactly corresponding to the pulley $q'$ above, but of course arranged inversely thereto, as shown. A belt $t'$ connects the pulleys $q'\ s'$, and may be shifted on said pulleys to regulate the speed of revolution of the shaft Q, from the small pulley $p'$ of which shaft there extends a belt $u'$ to and around a large pulley $v'$, mounted on a stud $w'$ on the side piece A. This pulley $v'$ has rigid therewith a toothed pinion $x'$, which meshes with the hereinbefore-named gear-wheel $u$.

S represents the main driving-shaft of the machine, supported in suitable bearings projecting from the left-hand side of the frame, as best shown in Figs. 6 and 7, power being transmitted thereto by means of a belt (not shown) on the tight pulley T on the counter-shaft $y'$, which counter-shaft also carries a loose pulley U at one end and a bevel gear-pinion $z'$ at its other end, said pinion meshing with a bevel gear-wheel V on said shaft S, and said shaft having at one end a pinion $a^2$, Fig. 6$^\text{a}$, meshing with a smaller pinion $b^2$ on the adjacent end of an extension W of the main shaft S, the other end of this shaft W terminating in a bevel-pinion $c^2$, which meshes with a like pinion $d^2$ on the end of the shaft X of the upper cone-pulley M, already referred to. Thus it will be seen that when power is applied to the pulley T the main driving-shaft S and its extension W will revolve, thereby causing a revolution of the cone-pulley M and (by reason of the interposed flexible ring O, already described) also of the cone-pulley N, and thence, by reason of the belt $t'$ on the pulley $s'$ of the shaft R of said pulley N, the shaft Q will be revolved from its pulley $q'$, and as the pulley $p'$ is fast on the same shaft the belt $u'$ on that pulley will revolve the large pulley $v'$ and its pinion $x'$, which will revolve the gear-wheel $u$, and thereby set in motion the trains of gears connected thereto, $v$, $w$, and $s$ to operate the feeding-belt $b$, while at the same time, as the said gear-wheel $u$ revolves, its journal $t$ turns the picker-roller D, and the strap and gear connections $e'$, $f'$, $g'$, $h'$, $i'$, $j'$, $k'$, and $d'$ revolves the journal $z$, and with it the picker-roller C.

Above the inner end of the feeder-belt $b$ there is a transverse shaft $e^2$, journaled in the side pieces A A of the head of the machine, the right-hand end of said shaft carrying a toothed pinion $f^2$, which meshes with the gear-wheel $u$, by which it is driven, and this shaft is provided with two bevel gear-pinions $g^2$, which mesh with two horizontally-disposed bevel gear-pinions $h^2$ on the upper ends of the vertical shafts of vertical rollers $i^2$, placed one each side of the feeding-belt $b$, and around each of these rollers $i^2$ there extend vertically-disposed endless guide-belts $j^2$, the inner end of one of these belts and its actuating-gear being shown at the extreme left in Fig. 1. At the other end of these guide-belts are simply vertical rollers, (not shown,) around which the said belts revolve.

The rollers $d$ $e$, which carry the endless belt F, are rigidly secured to their journals $k^2$ $m^2$, which latter have bearings in the side pieces A, and above the last-named roller $e$ there is a transverse shaft $n^2$, which is journaled in the side pieces A A and carries upon its outer right-hand end a toothed pinion $o^2$, which meshes with a gear-wheel Y, to be afterward described. This shaft $n^2$ is provided with two bevel gear-pinions $p^2$, which mesh with two horizontally-disposed bevel gear-pinions $q^2$ on the upper ends of the vertical shafts of vertical rollers $r^2$, placed one each side of the endless belt F, and around each of these rollers $r^2$ there extend vertically-disposed endless guide-belts $s^2$, the said belts, at the other end, passing around vertical rollers $t^2$, one of these guide-belts and its actuating-gear being shown in Fig. 1.

The gear-wheel Y, just referred to, is fast on the outer end of the journal $u^2$ of the roller G, already named, and said gear-wheel Y meshes with a toothed pinion $v^2$ on the outer end of the journal $m^2$ of the roller $e$ of belt F. A stud $w^2$ on the side piece A carries a toothed pinion $x^2$ and a large pulley Z, (the pinion and pulley being cast with or rigidly attached to each other,) and this pulley is connected by belt $y^2$ to the pulley $r'$ on the shaft R of the lower cone-pulley N. The toothed pinion $x^2$ meshes with the described gear-wheel Y and also with another gear-wheel A', whose journal $z^2$ carries a roller B', having fingers or pins $a^3$ $a^3$ on its periphery.

The hereinbefore-named yielding roller H is rigidly secured to its journal $b^3$, which latter, on its outer left-hand end, carries a toothed pinion $c^3$, and the journal $u^2$ of the roller G carries a like pinion $d^3$, both pinions being rigid on the ends of their respective journals and connected together by linked straps $e^3$ $f^3$, the pin $g^3$, which forms the pivotal connection of said straps, also carrying a loose toothed pinion $h^3$ in mesh with pinion $c^3$ and also in mesh with pinion $i^3$, loosely mounted on a stud or pin $j^3$ on the strap $e^3$, the latter pinion $i^3$ being also in mesh with the pinion $d^3$.

Beneath the roller B' is another roller C', whose journal $k^3$ (which is rigidly secured to said roller) has a slight play in slots $m^3$ in the side pieces A, said journal having bearing on the upright ends of a horizontal transverse yoke $n^3$, which yoke moves in said slots and is held up against the roller, as by springs $o^3$, so as to have a slight yield.

D' represents the carding-cylinder and consists, primarily, of side pieces, (uniform, exteriorly, with the balance of the sides of the machine,) having bolted upon the inner surfaces thereof camways, formed, preferably, of metal. These camways comprise a single continuous track $p^3$, and for about half the distance thereof an additional outer track $q^3$, mainly on the lower side of said continuous track, so as to form a cam-groove $r^3$ between them.

E' E' represent two annular wheel-like disks, the peripheral rims of said disks being provided with tangentially-disposed slots $s^3$ $s^3$ for the reception of bars $t^3$, provided with outwardly-projecting teeth or pins $u^3$ $u^3$, said bars being of greater length than the distance between the wheels, so as to project through said slots and beyond the edges of the tracks $p^3$ and within the cam-groove $r^3$ when that point is reached. These wheels are journaled upon a shaft F', resting in suitable boxes $v^3$, and one end of said shaft carries a large bevel gear-wheel G'. The main shaft S is provided with a toothed pinion $w^3$, which meshes with a larger gear-wheel $x^3$ on the end of a shaft $y^3$ in a supporting-frame $z^3$ $z^3$, and above and in line with this last-named shaft another shaft $a^4$ is journaled in the same frame and bears upon one end a gear-wheel $b^4$, meshing with the wheel $x^3$, and upon its other end a small bevel gear-pinion $c^4$ in mesh with the wheel G', and by this means the wheels E' E' are revolved by the main driving-shaft S. The carding-cylinder D' is partially covered on top, as shown at $d^4$, by a concave provided with downward-projecting inclined teeth or pins $e^4$ $e^4$, and the otherwise-exposed portion of the cylinder is provided with a series of packers $f^4$, of an approximately crescent shape, which are united to a transverse strip of wood $g^4$, as by screws $h^4$ $h^4$, the said wood strip acting as a spring and its ends being secured to the side pieces of the carding-cylinder, as by screws or bolts $i^4$, and the said wood strip being located just above a cross-timber $j^4$ of the machine, said packers being arranged one between each two adjacent teeth or pins $u^3$ $u^3$ of the bars $t^3$.

H' is another horizontally-disposed endless belt, which travels beneath the carding-cylinder D' over rollers $k^4$ $m^4$ $n^4$, having rigid journals, (marked $o^4$, $p^4$, and $q^4$, respectively,) which have bearings in the side pieces A A. The rollers $m^4$ $n^4$ are idlers, but the journal $o^4$ of the roller $k^4$ is provided at one end with a bevel gear-pinion $r^4$, which meshes with a like pinion $s^4$ on the adjacent end of a short counter-shaft $t^4$, mounted in the frame $z^3$, and carrying at its other end a toothed pinion $u^4$, which meshes with a larger pinion $v^4$ on the main driving-shaft S, and thus the said belt H' is actuated by said shaft S.

Above the idler $m^4$ the side pieces A A are formed with obliquely-disposed slots $w^4$ to receive and afford play to the journal $x^4$ of a large pressure and guide roller I', and at some little distance therefrom there is located a transverse shaft J', journaled in the side pieces and provided with pulleys $y^4$ and $z^4$, and a belt $a^5$ connects the roller I' with the pulley $y^4$ on shaft J', and this belt $a^5$ is kept at the proper tension by a roller $b^5$, pivoted to one end of an arm $c^5$, whose other end is pivotally attached, as shown at $d^5$, to a lug secured to the cross-timber $j^4$, as shown at $e^5$.

K' L' represent a pair of large rollers, the journal $f^5$ of the upper roller K' being journaled in the side pieces A A, so as always to revolve in the same plane, while the journal $g^5$ of the lower roller L' is mounted in movable blocks $h^5$, hinged at one end, as shown at $i^5$, to the under side of the side pieces A A. These blocks are provided with vertical slots $j^5 j^5$, and lag-screws $k^5 k^5$ (of considerably less diameter than that of the said slots $j^5 j^5$ to allow of the blocks yielding downwardly under pressure) are passed up through said slots and into the side pieces A A, springs $m^5 m^5$, which may be simply rubber blocks, being interposed between the heads of said screws and the under surfaces of the blocks $h^5$ to normally keep the latter in contact with the under side of the side pieces, as best shown in Fig. 6.

A belt $n^5$ connects the roller K' with the pulley $z^4$ on the shaft J', and one end of the journal $f^5$ of said roller K' carries a bevel gear-wheel $o^5$, which meshes with a bevel gear-pinion $p^5$ on the shaft S, whereby said roller K' is driven. The other end of this journal $f^5$ is provided with a toothed wheel $q^5$, which meshes with a like wheel $r^5$ on the end of the journal $g^5$ of the roller L', and the teeth of these wheels are of sufficient length or depth to prevent the two wheels from being separated when the roller L' yields slightly downwardly under pressure.

M' is a transverse shaft similarly journaled in the side pieces A A, said shaft carrying at one end a toothed pinion $s^5$, which meshes with the gear-wheel $q^5$, just named, and is driven thereby. This shaft is provided with two bevel gear-pinions $t^5 t^5$, which are adjustably secured thereto, (by means of the set-screws $u^5 u^5$, which pass through the collars or hubs of said pinions and bear against the shaft,) so as to be moved nearer together or farther apart, as desired.

N' N' represent frames for the vertical guide-belts $v^5$, one end of one of said frames being shown in detail in Fig. 14, said frames each consisting of top boards $w^5$ and bottom boards $x^5$, united by vertical pieces $y^5$ at intervals. At one end the frame receives the vertical shaft $z^5$ of the vertical end roller $a^6$, the roller at the other end of the frame not being shown in Fig. 14, but its shaft $b^6$ being shown in Fig. 1, where said roller is concealed by the belt $v^5$. At the last-named end the frames N' are supported upon the frame of the side pieces of the machine by an ordinary pivot-bolt, (not shown,) but at the other end a different fastening is necessary in order to move the frames at such end nearer to or farther from each other when it is desired to vary the width of the devices being made. This is done as follows:

O' is a bar or beam extending transversely across the machine from side to side just above the tops of the frames N' N', and P' P' represent yokes which straddle this bar or beam and are secured to the tops of the frames N' N', and $c^6 c^6$ are thumb-screws which pass through screw-threaded perforations in the upper parts of said yokes and bear against said bar or beam O'. The upper ends of the vertical shafts $z^5 z^5$ are fitted with bevel gear-pinions $d^6 d^6$, which mesh with the pinions $t^5 t^5$ on the shaft M', and when it is desired to vary the space between the last-named pinions the set-screws $u^5 u^5$ are loosened and the pinions moved and reset, and, similarly, to bring them again in mesh with the pinions $d^6 d^6$ the thumb-screws $c^6 c^6$ are loosened and the frames N' N' moved till the said pinions are again in mesh, when the thumb-screws are tightened, and as the yokes P' are wider than the bar or beam O' this change of position is readily accomplished.

Beneath the just-described frames N' N' is located a floor or platform $e^6$, and below this is located the paper-supporting frame. (Best shown in Figs. 1 and 2.) Projecting from a pair of posts or supports B B are lugs or brackets $f^6$, which serve as bearings for the reception of a shaft $g^6$, said shaft being centrally screw-threaded and provided with hand-wheels $h^6 h^6$ at each end, like the shaft shown in Fig. 9. The screw-threaded portion of this shaft is received within a nut $i^6$, which nut has a bifurcated end to receive one end of a lever $j^6$, which latter is pivotally attached by bolt $e^9$ to said nut and suspended from a central hanger $k^6$, to which it is pivotally attached, as shown, by a bolt $m^6$, passing through a slot $n^6$ in said lever to prevent binding. The other end of this lever $j^6$ is similarly pivoted by a bolt $o^6$, passing through a slot $p^6$ in the lever up into a cross-bar $q^6$, from which depend two side bars $r^6 r^6$, hooked or slotted at their lower ends to receive the trunnions $s^6$ of a paper roller or gudgeon. This gudgeon is square in cross-section, and after the paper roll $t^6$ has been forced thereon a round disk $u^6$ (with a square central opening) is driven onto the gudgeon, and a tension-strap $v^6$ is secured around the said disk, there being a projection terminating in a screw $w^6$, secured to one end of said strap $v^6$, and another projection, $x^6$, secured to the other end of said strap, this latter projection having a hole therethrough to receive the screw $w^6$ at the end of the other projection (which screw is secured by a nut $y^6$, by which the two ends of the strap are drawn tightly together) and terminating in a small roller or pulley $z^6$. The same construction is shown in Figs. 1$^\text{a}$ and 9 with the same reference-letters, and where the square-edged gudgeon is also shown, (marked $a^7$.) Pivoted latches or buttons $b^7$ serve to secure the trunnions $s^6$ of the gudgeon in place, and the described roller $z^6$ bears against lug $f^9$, projecting from the adjacent side bar $r^6$, (or $E^2$.)

The pair of supports B, between which the paper roll is located, are united by an upper cross-bar $c^7$, and the side bars $r^6$ of the frame have preferably projections $d^7$, resting on and sliding along said cross-bar $c^7$ as an additional means of support. Thus it will be seen that if it is desired to shift the gudgeon and roll of paper carried thereby laterally this is done by turning one of the hand-wheels $h^6$, which causes the screw-threaded portion of the shaft $g^6$ to move the nut $i^6$ one way or the other, and with it the lever $j^6$ and the paper roll supported in the frame at the other end of the said lever, the slots $n^6$ $p^6$ in said lever preventing any binding or cramping, especially as the distance which the roll will move laterally is only an inch or two. As the paper is drawn from the roll in a continuous sheet (marked Q') it passes over a roller $e^7$, supported in brackets on the side bars $r^6$ of the supporting-frame and thence up over another roller, $f^7$, and thence (together with the excelsior received at this point, as hereinafter explained) is carried above the floor or platform $e^6$ and beneath the frames N' N' and their vertical guide-belts $v^5 v^5$ to and between the rollers K' L' and on to a former, as will be explained subsequently.

The former just referred to resembles in its general construction that shown in the said prior patent hereinbefore referred to, but differs somewhat in the shape of its parts and accessories. It consists, primarily, of a flattened tapering tube R', generally oval in cross-section and open at its top for part of its length, and an inclosed flat tapering mandrel S', suspended so as to nowhere touch the said tube. The mandrel is supported in place by means of cross-bars $g^7$ $h^7$, which extend across the machine and rest on the side pieces A A, the cross-bar $g^7$ resting in slots $p^7$ cut in said side pieces, and the cross-bar $h^7$ having holes in its ends to receive vertical pins $i^7 i^7$, projecting up from said side pieces, so that said cross-bars may be readily removed when the former is to be changed for one of a different size. The cross-bar $g^7$ is fastened by a bolt $j^7$ to the upper surface of the mandrel S', but the attachment between said mandrel and the cross-bar $h^7$ is differently made, and is as follows: A yoke or clip $k^7$ is secured to said mandrel, which it straddles, by means of screws $u^7$, which pass through the lower ends of the yoke into the side edges of the mandrel, and the top of this yoke is provided with an upwardly-extending screw-bolt $m^7$, integral or rigid therewith, and the screw-threaded part of this bolt passes up through a hole in the said cross-bar $h^7$, having an adjusting-nut $n^7$ just beneath said bar, and a hand-nut $o^7$ is screwed on the upper projecting end of said screw-bolt $m^7$, so as to hold the device firmly to said cross-bar.

The former-tube R' is supported at two points, as follows: Near its widest or receiving end its upwardly-extending side edges are provided with slots $q^7 q^7$, through which the ends of the cross-bar $g^7$ are thrust, said ends then dropping into the slots or recesses $p^7$ in the side pieces A A. The other support is made by a spiral spring $r^7$ passing under the tube, (but not attached thereto,) the ends of this spring being secured to chains $s^7 s^7$, and said chains are adjustably fastened to hooks $t^7 t^7$, which depend from the cross-bar $h^7$, all as shown in Fig. 8, the object of the spring $r^7$ being to permit a slight yield downward to the tube, and the adjustment of the chains $s^7$ being effected by hooking any one of the links of said chains on each side into the adjacent hook $t^7$, according to the normal distance desired between the tube and mandrel at this point, the lower ends of the yoke or clip $k^7$ only coming down flush with the bottom of the mandrel, so that there is a practically clear space all around the latter within the tube.

The extreme tapered end of the mandrel S' projects some little distance beyond the end of the former-tube R', and said mandrel bears at said extreme end a roller $v^7$ and has another roller $w^7$ on its upper surface adjacent to its other end, and a guiding-tape T' passes over these rollers and around the large roller K' and thence under and entirely round the mandrel S', so that said tape shall always bear on the excelsior from the time that the same (on its paper sheet) passes between the rollers K' L' to the time the folded mat leaves the end of the mandrel ready to be glued. Just after it leaves said end it encounters the spout $x^7$ of a glue-pot $y^7$, one folded edge of the paper traveling over this spout end, as hereinafter explained.

U' V' are two rollers having journals $a^8 b^8$, respectively, the journal $a^8$ of the upper roller being mounted in the side pieces A A, so as to always revolve in the same plane, while the journal $b^8$ of the lower roller is mounted in hinge-blocks $z^7$ in precisely the same manner that the roller L' is mounted to similarly permit a downward yield of said lower roller. In this respect these rollers U' V' (which receive the glued product and deliver the same to the cutting device) are substantially the same as the delivery-rollers in the said prior patent hereinbefore named; but the small rollers between these delivery-rollers and the cutting device are arranged and geared somewhat differently. The journal $a^8$ of the roller U' carries at one end a bevel gear-wheel $c^8$, which meshes with a bevel gear-pinion $d^8$ on the main driving-shaft S, whereby the said roller U' is driven. At the other end of said journal $a^8$ is a gear-wheel $e^8$, which meshes with the gear-wheel $f^8$ on the adjacent end of the journal $b^8$ of the lower delivery-roller V', and also meshes with a toothed pinion $g^8$ on a stud $h^8$. This latter pinion is also in mesh with a wide pinion $i^8$ on stud $j^8$ and with pinion $k^8$ on the shaft $m^8$ of roller $n^8$, while another pinion $o^8$, on the shaft $p^8$ of roller $q^8$ meshes with the just-described pinions $i^8$ and $k^8$. The shaft $p^8$ of the roller $q^8$ revolves in fixed bearings, and always in the same plane; but the shaft $m^8$ of the roller $n^8$ is journaled in boxes attached to a sliding frame $r^8$, which frame moves up and down in guideways $s^8 s^8$, the roller $n^8$ being made of sufficient weight to dispense with the need of a cord-and-weight attachment, such as was shown in the prior patent hereinbefore named.

W' is the shaft, which carries at one end the revolving knife X', whose blade cuts against the stationary blade Y', which projects from the frame of the machine at this end. Z' is an annular guard or shield for the revolving knife. The shaft W' is journaled at the knife end in a box $t^8$ on one of the posts of the main frame and at its other end is supported in a bracket $u^8$, projecting from another post of the main frame, and just beyond said bracket the said shaft W' carries a removable collar $v^8$, a toothed pinion $w^8$, and nut $x^8$. The bracket $u^8$ is formed with an arc slot $y^8$. An adjusting-lever $z^8$ is mounted loosely on the main shaft S close to and on one side of the bracket $u^8$, and on the same shaft, on the other side of the said bracket, there is rigidly secured a pinion $a^9$. On the stud $b^9$, which projects from said bracket $u^8$, there is loosely mounted a compound pinion $c^9$ $d^9$, the larger one, $c^9$, of which is shown as in mesh with the pinion $a^9$ and the smaller one, $d^9$, in mesh with the pinion $w^8$. In making different sizes and styles of pads and the like with this machine it frequently becomes necessary to change these different pinions about or substitute others for them, for which purpose the adjusting-lever $z^8$ has to be moved, and for this reason said lever is held to its desired position by means of a bolt $g^9$, which passes through said lever and through the described arc slot $y^8$, there being a nut, as shown, in said bolt for obvious use in this adjustment.

The operation of this device will be readily understood from the foregoing description of its construction, taken in connection with the accompanying drawings.

The progress of the excelsior from the feeding-belt $b$ to and between the picker-rollers C D E and thence along the endless belt F to and between the rollers G H has already been described. From this point the excelsior passes to and between the rollers B' C', (any that falls short being small pieces that drop onto the endless belt H' and are carried forward by it,) the teeth or pins $a^3$ $a^3$ on the roller B' serving to catch the excelsior as it comes from between the rollers G H and carry it forward between rollers B' and C', as stated, to the carding-cylinder D', whose teeth or pins $u^3$ $u^3$ seize the excelsior and carry same up and around beneath the toothed concave $d^4$, the teeth on said concave and on the roller B' combining with the carding-cylinder teeth to comb and card out the fibers of the excelsior, and thus reduce the thickness of the mass and transform it into the semblance of a continuous sheet or mat $A^2$, which is carried forward between the carding-cylinder and the spring-packers $f^4$ in the continued revolution of the said cylinder until the said mat reaches the roller I', by which it is brought down to the endless belt H' and carried forward (together with any small pieces on said belt, as heretofore referred to) under said roller I', being subjected to pressure from the weight of said roller, as it passes over the idler $m^4$ beneath the roller I', and from this point the belt H' carries the mat forward onto the continuous sheet or web of paper Q', which now acts like a carrying-belt, the excelsior mat being regulated in width by its passage between the vertical belts $v^5$ $v^5$, and being next carried by and with the web of paper Q' between the rollers K' L' and thence into the former-tube R'. Just as the paper and excelsior mat leave the rollers K' L' the described endless tape T' bears upon the upper surface of the mat and aids in carrying it forward and guards against any break in the continuity. In the forward progress of the paper and mat through the former-tube and beneath the mandrel S' the shape of the said tube R' as it begins to taper folds one edge of the paper down upon the excelsior mat and bends the other edge over and slightly above this folded-down edge, as shown in the sectional view, Fig. 12, and as the paper and excelsior in this partly-folded condition emerge from the forming device they are carried forward to and between the delivery-rollers U' V', and the interposed spout $x^7$ of a glue-pot $y^7$ projects between the partly-open adjacent edges of the paper and deposits a stream of glue, and as the folded paper and excelsior pass between the said rollers U' V' the edges of the paper are brought together and thus secured by the glue, and as this continuous glued package passes through and beyond said rollers the revolving knife X' comes against the package and shears it in two against the edge of the stationary knife Y', thus severing the continuous package into sections of the desired length, this length being regulated by the size and arrangement of the pinions and adjusting-lever adjacent to the described bracket $u^8$, one of said sections showing the compressed shape and cut end being shown in Fig. 13.

In Figs. 1ª and 9 I have shown another roll of paper suspended on a frame between upright timbers $B^2$ $B^2$, (which are merely vertical extensions of the legs or supports B B of the machine,) said views comprising a screw-threaded rod $C^2$ with hand-wheels $D^2$ $D^2$, (corresponding to the rod $g^6$ and hand-wheels $h^6$ $h^6$ shown in Figs. 1 and 2,) the suspended frame $E^2$ $F^2$ $E^2$ having a central nut $G^2$, which enables said frame to be shifted laterally by turning of said rod $C^2$ just as the nut $i^6$ (shown in Fig. 1) enabled that frame to be laterally shifted for a like purpose, and the gudgeon, paper-roll, tension-strap, and other accessories are alike in both instances. The object of this supplementary frame is to adapt my present machine to make packing-tubes, such as are shown and described in said prior patent, No. 430,325, hereinbefore referred to, and the only change in the present machine necessary to accomplish this purpose besides the addition of this extra or upper roll of paper is the substitute of the former and mandrel shown in that patent for the one shown and described in this application, together with the additional gluing devices for the paper for the upper roll, as set forth in said proir patent, one of the said upper glue-pots being shown at H² in dotted lines in Fig. 1ª of the drawings of this present application. This dotted figure H² is merely designed to indicate the relative location of the glue-pot in question when the suggested changes are made, and the spout shown in said dotted figure is the one that feeds a line of glue along the longitudinal center of the excelsior upon the lower strip of paper when tubes are being manufactured, as described in the prior patent, No. 430,325, but the details of construction and arrangement of this glue-pot and its spouts are not shown in the present drawings.

Among the chief advantages of the present machine may be named the feed-regulating device, (shown in detail in Fig. 3,) whereby the speed with which the excelsior is fed to the machine is predetermined, this being accomplished, as shown best in Fig. 15, by turning the right and left handed screw-bolt $o$ (by its hand-wheel I²) through the shackle-lugs J² K². These lugs consist of blocks provided with screw-threaded bores for the screw-bolt $o$ and having projecting bolts passing through holes in the levers J K, with nuts on the ends of said bolts, said nuts not being screwed too tightly against the levers, as it is necessary that the bolts on the lugs shall be able to move freely. Hence by turning the screw-bolt $o$ to the right or left the levers J K will be separated or drawn toward each other, and consequently the flexible ring O will be moved to the point desired between the cone-pulleys M N, and the rate of speed at which the excelsior is fed (and the consequent thickness or thinness of the resulting mat) can thus be regulated to a nicety.

Another great advantage of the present machine lies in the construction of the carding-cylinder, wherein, by the action of the toothed bars $t^3$, the excelsior is carried forward just to the point where the roller I' is located, and then, by the retraction of the teeth $u^3 u^3$, caused by the travel of the bars $t^3$ within the cam-groove $r^3$, the excelsior is instantly freed from the teeth and swept under the roller I' by its revolution and the travel of the endless belt H'.

The object of the described tension-strap $v^6$ on the disk $u^6$ of the gudgeon of the paper-roll $t^6$ is to prevent the continuous sheet or web Q' of paper from unrolling too fast from said roll, this action being retarded by the contact of the described roller $z^6$ against the lug $f^9$ on one of the suspended side pieces of the paper-supporting frame, and as this is a rolling contact the tension is not so great as to cause any danger of the said sheet or web of paper becoming broken or parted in consequence thereof, and this is an important advantage of the present construction.

The object of suspending the former-tube and mandrel from removable cross-bars $g^7 h^7$ is to enable tubes and mandrels of different sizes and shapes to be substituted for those shown in the drawings, according to the size or style of the pad, wrapper, or other article to be made by the machine, as already indicated by the suggestion of the use of the former and mandrel shown in the prior patent hereinbefore referred to, although former-tubes and mandrels of divers other shapes may be employed when desired.

Having thus described my invention, what I claim as new, and desire to secure by Letters Patent, is—

1. The combination, with a suitable frame, of a pair of horizontally-disposed endless feed-belts, arranged on different planes, two pairs of vertically-disposed endless guide-belts, each of said endless feed-belts being arranged between one of said pairs of guide-belts, a pair of picker-rollers, one of which is mounted on yielding bearings, arranged adjacent to the end of the first feed-belt and above the plane of the other feed-belt, gearing and belting for operating all of said parts in conjunction with each other, and an independently-geared picker-roller arranged adjacent to the pair first named, and adapted to be revolved at a greater rate of speed than the first-named picker-rollers, substantially as set forth.

2. The combination, with a suitable frame, of a pair of horizontally-disposed endless feed-belts, arranged on different planes, a pair of picker-rollers arranged adjacent to the delivery end of the first feed-belt and above the plane of the second feed-belt, a pair of pressure-rollers arranged, one above the other, adjacent to the delivery end of the second feed-belt, and the lower of said pressure-rollers having yielding bearings on a transverse yoke, gearing and belting for operating all of said parts in conjunction with each other, a pivotally-suspended lever in engagement with said yoke, and a feed-regulating device connected to said lever and to the gearing of said picker-rollers, whereby, when the material passing between the pressure-rollers separates them too widely, the picker-rollers will revolve at a less rate of speed, substantially as set forth.

3. The combination, with a suitable frame, of a pair of horizontally-disposed endless feed-belts, arranged on different planes, a pair of picker-rollers, one of which is mounted on yielding bearings, arranged adjacent to the delivery end of the first feed-belt and above the plane of the second feed-belt, a pair of pressure-rollers arranged one above the other adjacent to the delivery end of the second feed-belt, and the lower of said pressure-rollers having yielding bearings on a transverse yoke, gearing and belting for operating all of said parts in conjunction with each other, a pivoted lever suspended beneath the second feed-belt, one end of said lever being in engagement with said yoke, a partly-revoluble rod journaled on the main frame and carrying a rigid crank-arm, a link connecting said crank-arm to the other end of said lever, a pair of cone-pulleys journaled adjacent to each other, a flexible ring surrounding one cone-pulley and in movable contact with both, a pair of levers adjustably shackled together, one of said levers being rigidly secured to the partly-revoluble rod and the other being pivoted to the frame, and carrying the described flexible ring, and the shaft of one of said cone-pulleys being geared to the main driving-shaft of the machine, while the shaft of the other cone-pulley is connected, by a system of belts and pulleys, with the gearing of the said picker-rollers, substantially as set forth.

4. The combination, with a suitable frame, of a carding-cylinder, comprising side pieces, having secured upon the inner surfaces thereof camways, consisting of single continuous tracks, and for about half the distance thereof, additional outer tracks, forming cam-grooves between, a pair of annular disks or wheels whose rims are provided with tangentially-disposed slots, a series of movable bars projecting through said slots and in engagement with said tracks and cam-grooves, said bars being provided with projecting teeth or pins, and a series of spring-packers supported adjacent to said carding-cylinder, and arranged one between each two adjacent teeth or pins of said movable bars, substantially as set forth.

5. The combination, with a suitable frame, of side pieces provided with cam tracks and grooves, a carding-cylinder having annular disks or wheels, with tangentially-disposed slots in the rims thereof, and movable bars projecting through said slots and in engagement with said cam tracks and grooves, and carrying projecting teeth or pins, a toothed concave covering part of said cylinder, and spring-packers arranged in series between the teeth or pins on the movable bars, feeding-rollers one of which always revolves on the same plane and is provided with teeth or pins, and the other of which is mounted on yielding bearings, an endless carrying-belt below said cylinder, and a pressure and guide roller located above said belt and adjacent to the cylinder, at a point just beneath the packers where the described teeth or pins on the movable bars are retracted by the travel of said bars within the cam-groove, substantially as set forth.

6. The combination, with a suitable frame, of a former-tube suspended therefrom, a mandrel suspended within and projecting from the forward end of the former-tube, a small roller at the forward end, and another roller on the upper surface of said mandrel, a pair of feed-rollers arranged one above the other adjacent to one end of the former-tube and mandrel, and a pair of delivery-rollers, similarly arranged adjacent to the other end thereof, a continuous guiding-tape passing around and over the upper feed-roller, thence under the roller on the upper surface of the mandrel and around the roller on the forward end thereof, and back beneath the mandrel to the said feed-roller, and a glue-pot spout interposed between the forward end of the mandrel and the said delivery-rollers, substantially as set forth.

7. The combination, with a suitable frame, of a pair of feed-rollers, arranged one above the other to receive between them the fabric and filling as they are fed forward, a transverse shaft adjacent to the upper feed-roller, and geared to the journal of the latter, bevel gear-pinions adjustably secured to said transverse shaft, a pair of movable upright frames carrying vertical shafts at their adjacent ends, bevel gear-pinions on said shafts in mesh with the pinions on the transverse shaft, vertical shafts at the other ends of said upright frames, vertical rollers on said vertical shafts at each end of said frames, and vertical guide-belts traveling around said vertical rollers, a transverse bar or beam extending across the main frame just above the tops of the movable upright frames, yokes straddling this bar or beam and secured to the tops of the said upright frames, and thumb-screws passing through screw-threaded perforations in the upper parts of said yokes, and bearing against the top of said bar or beam, substantially as set forth.

8. The combination, with a suitable frame, provided with slots or recesses in the side timbers thereof, and upward-projecting pins on the upper surfaces of said side timbers at some considerable distance from said slots or recesses, of a tapering former-tube provided with slots in its side walls adjacent to its rear or widest end, a removable cross-bar inserted through said slots and having its ends dropped within the slots or recesses in the side timbers, a second cross-bar having perforations in its ends for removable engagement with the said upward-projecting pins on said side timbers, hooks depending downward from said second cross-bar, a pair of chains, the links of which are adjustably engageable with said hooks, and a spiral spring extending under the former-tube at this point and the ends of which unite the adjacent ends of said pair of chains, substantially as set forth.

9. The combination, with a suitable frame provided with slots or recesses in the side timbers thereof, and upward-projecting pins on the upper surfaces of said side timbers at some considerable distance from said slots or recesses, of a removable cross-bar having its ends dropped within the said slots or recesses, and a second cross-bar having perforations in its ends for removable engagement with said upward-projecting pins of said side timbers, a removable tapering former-tube adjustably suspended from said cross-bars, a removable tapering mandrel suspended within said former-tube but free from contact therewith, one end of said mandrel being secured by a bolt to the first-named cross-bar, a yoke or clip straddling said mandrel, the lower ends of said yoke or clip coming flush with the bottom of the mandrel and secured thereto and said yoke or clip having an upward-projecting screw-bolt rigid therewith extending through a hole in the second cross-bar, an adjusting-nut on said screw-bolt just beneath said bar, and a hand-nut on the upper end of said bolt above said bar, substantially as set forth.

10. The combination, with a suitable frame, of a pair of rollers, arranged one above the other, the journal of the upper roller always revolving in the same plane, in suitable bearings in said frame, a pair of blocks hinged to the under surface of the side timbers of said frame and receiving the journal of the lower roller, said blocks being formed with vertical slots therethrough, lag-screws passed upward through said slots in the blocks, without contact with the walls of said slots, into the timbers of the frame above, and springs interposed between the heads of said lag-screws and the under surfaces of said timbers, substantially as set forth.

11. The combination, with a suitable frame, of a horizontally-disposed endless feed-belt passing over rollers, the journal of the roller at the delivery end carrying a toothed pinion at one end exterior to the frame, a pair of picker-rollers arranged one above the other, one of whose journals travels always in the same plane, and carries a large gear-wheel at one exterior end, and a small pinion at the other exterior end, while the journal of the other picker-roller of said pair rests upon yielding bearings within slots of the side pieces of the main frame, and carries at one exterior end a small pinion, the said journals of said pair of picker-rollers being united by link-straps carrying pinions in mesh with the said small pinions on said journals; a pair of studs projecting from the opposite side piece of the frame, carrying pinions in mesh with each other, one of said last-named pinions being in mesh with the pinion of the journal of the adjacent roller of the endless feed-belt, and the other of said pinions being in mesh with the large gear-wheel on the adjacent end of the journal of the first-named picker-roller; a stud on the same end piece of the main frame carrying a large pulley and a pinion integral therewith in mesh with said large gear-wheel of said first-named picker-roller; a transverse shaft on the main frame having pulley-belt and gear connections with the main driving-shaft, and carrying a small independent pulley, and a belt extending from this last-named pulley to the described large pulley on the stud, substantially as set forth.

12. The combination, with a suitable frame, of a pair of horizontally-disposed endless feed-belts arranged on different planes a pair of picker-rollers arranged one above the other adjacent to the delivery end of the first feed-belt, and the journal of one of said picker-rollers having a yielding bearing, a pair of pressure-rollers similarly arranged adjacent to the delivery end of the second feed-belt, and the journal of one of said pressure-rollers also having a yielding bearing; a pair of feed-rollers, similarly arranged, just beyond the pressure-rollers and the journal of one of said feed-rollers having also a yielding bearing, a feed-regulating device comprising a pair of cone-pulleys mounted on transverse shafts in a frame, so as to be almost, but not quite, in contact, and a movable flexible contact-ring around one of said cone-pulleys and in contact with both; a lever-and-link connection between the movable flexible contact-ring of the feed-regulating device, and the yielding bearing of the lower feed-roller; a main driving-shaft; a bevel-gear connection between the main driving-shaft and the shaft of the upper cone-pulley; a small independent pulley and a stepped cone-pulley on the shaft of the lower cone-pulley; a transverse shaft above the feed-regulating device carrying a small independent pulley, and a stepped cone-pulley; a belt connecting the said two stepped cone-pulleys; pinions on the journals of the rollers of the delivery ends of the feed-belts; a gear-wheel on one end of the upper picker-roller, a train of gears meshing therewith and with the pinion of the adjacent roller-journal of the first feed-belt; a linked strap-and-pinion connection, on the other side of the machine, between the journals of the said pair of picker-rollers; a like linked strap-and-pinion connection between the journals of the pressure-rollers; a gear-wheel on the other end of the journal of the upper pressure-roller, in mesh with the pinion of the adjacent roller-journal of the second feed-belt, a stud on the frame carrying a large pulley and a pinion rigid therewith, said pinion being in mesh with the large gear-wheel of the journal of the upper pressure-roller; a like large gear-wheel on the adjacent end of the journal of the upper feed-roller, in mesh with the pinion on the stud; a like stud carrying a large pulley and a pinion rigid therewith in gear with the large gear-wheel on the journal of the first-named picker-roller, a belt connecting the last-named large pulley with the small independent pulley on the transverse shaft above the feed-regulating device, and another belt connecting the small independent pulley on the shaft of the lower cone-pulley with the large pulley on the stud between the gear-wheels of the upper pressure and feed rollers, substantially as set forth.

13. The combination with a suitable frame, of a former-tube and mandrel supported thereby, a pair of delivery-rollers, arranged one above the other, the journal of the lower roller being mounted in yielding bearings, a glue-pot spout interposed between the forward end of the mandrel and the said rollers, a main driving-shaft having a bevel-gear connection with the journal of the upper delivery-roller, a bracket provided with an arc slot, secured to the main frame, and through which bracket the main driving-shaft passes, a pair of compressing-rollers journaled near the end of the main frame, a train of gears connecting the said rollers with the upper delivery-roller; a stationary blade projecting from the end of the machine; a knife-shaft carrying a revolving knife at one end, and at its other end passing through said bracket and there carrying a pinion; a removable collar on the said knife-shaft between the bracket and pinion; an adjusting-lever mounted loosely on the main driving-shaft close to and on one side of the bracket, and a pinion rigid on said shaft on the other side of the bracket; a stud projecting from the bracket carrying a compound pinion loosely mounted thereon for engagement with the pinion on the main driving-shaft and the pinion on the knife-shaft; and a bolt passing through the adjusting-lever and through the arc slot in the bracket and carrying a tightening-nut on its end, substantially as set forth.

14. The combination, with a suitable frame, of a carding-cylinder provided with retracting teeth; an endless feed-belt located beneath the same, a pressure and guide roller having a journal mounted in oblique slots in the side pieces of the frame; an idler-roller beneath the last-named roller, within the endless feed-belt; a paper-supporting frame on a plane below said endless belt, carrying a roll of fabric, a transverse roller for said fabric beneath the delivery-end roller of said endless belt; a main driving-shaft; a pair of large rollers, arranged one above the other, and with the journal of the lower roller mounted in yielding bearings, and with the journal of the upper roller connected by bevel-gearing to the main driving-shaft; a transverse shaft adjacent to said rollers, and carrying a pair of pulleys; a belt connecting one of said pulleys to the upper of said rollers; another belt connecting the other pulley on said shaft with the first-named pressure and guide roller; a pair of movable upright frames, carrying vertical guide-belts, extending between the pair of large rollers named and the delivery end of the feed-belt; a cross-timber on the main frame adjacent to the carding-cylinder, and an arm pivotally attached to said cross-timber, and carrying a roller at its lower end resting on the last-named pulley-belt, substantially as set forth.

In testimony that I claim the foregoing I have hereunto set my hand, at Sheboygan, in the county of Sheboygan and State of Wisconsin, in the presence of two witnesses.

HELON F. SHADBOLT.

Witnesses:
A. C. PRESCOTT,
THEO. BEUFEY.